(12) United States Patent
Melen

(10) Patent No.: US 6,215,825 B1
(45) Date of Patent: Apr. 10, 2001

(54) STEREOGRAPHIC IMAGE COMPRESSION WITH IMAGE DIFFERENCE GENERATION AND LOSSY COMPRESSION

(75) Inventor: Roger D. Melen, Los Altos Hills, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/113,813

(22) Filed: Jul. 9, 1998

(51) Int. Cl.$^7$ .................................................... H04N 7/12
(52) U.S. Cl. .................................. 375/240.26; 375/240.28
(58) Field of Search .................................. 348/42–43, 51, 348/384.1, 388.1, 390.1, 397.1, 399.1, 409.1, 425.1, 425.4, 426.1; 375/240.12, 240.21, 240.26, 240.28, 240.29; 382/232, 244

(56) References Cited

U.S. PATENT DOCUMENTS

| | | | |
|---|---|---|---|
| 4,704,627 | * 11/1987 | Yuyama et al. | 348/43 |
| 4,884,131 | * 11/1989 | Chevion et al. | 348/43 |
| 5,619,256 | * 4/1997 | Haskell et al. | 348/43 |
| 5,633,682 | * 5/1997 | Tahara | 348/384 |
| 5,652,616 | * 7/1997 | Chen et al. | 348/43 |
| 5,886,736 | * 3/1999 | Chen | 348/43 |
| 6,057,884 | * 5/2000 | Chen et al. | 348/416 |
| 6,072,831 | * 6/2000 | Chen | 375/240 |

* cited by examiner

Primary Examiner—Vu Le
(74) Attorney, Agent, or Firm—Fenwick & West LLP

(57) ABSTRACT

A stereographic image compressor (100) includes a function processing unit (118) that generates a difference signal (120) indicative of differences between a first image signal (110) and a second image signal (112) which are indicative, respectively, of first and second fields of view (111, 114) of an image (104). The difference signal (120) is compressed by a lossy compressor (122) for storage on a storage device (102). The first image signal (110) is also compressed by a lossy compressor (124) for storage on the storage device (102). The image signals (110 and 112) are time synchronized by an image data synchronizer (116). The function processing unit (118) generates difference signal (120) by way of one of a plurality of mathematical operations.

15 Claims, 5 Drawing Sheets

STEREOGRAPHIC IMAGE COMPRESSION WITH IMAGE DIFFERENCE GENERATION AND LOSSY COMPRESSION

RELATED APPLICATIONS

This application is related to the following U.S. Patent Applications which are filed concurrently herewith and which are assigned to the assignee of the present application:

STEREOGRAPHIC IMAGE COMPRESSION WITH IMAGE MOMENT NORMALIZATION U.S. Ser. No. 09/113,937 filed Jul. 9, 1998, AND STEREOGRAPHIC IMAGE COMPRESSION WITH ADAPTIVE CONTROL PARAMETER GENERATION now U.S. Pat. No. 6,097,844 issued Aug. 1, 2000.

TECHNICAL FIELD

This invention relates generally to the field of image compression and more particularly to the field of compression of stereographic images.

BACKGROUND ART

Stereographic images are typically generated with two electronic image sensing arrays. These arrays are positioned at a distance from each other to create a pair of images having different fields of view of the same scene. The resulting images can then be used to create a composite image containing depth information. Such depth information provides increased realism by providing a three-dimensional (3D) type view. A significant drawback to such images is the increased data generated by such images and the associated increased storage requirements for such data. The data generated by the dual arrays is twice the amount of data generated for an image having only a single field of view. High resolution images, which contain more data, amplify this problem. Data compression is a known technique for reducing data storage requirements. There remains, therefore, a need for further reduction of data storage requirements for stereographic images while maintaining acceptable image quality.

BRIEF SUMMARY OF THE INVENTION

The present invention advantageously provides reduction of data required to store and generate stereographic images. In a principal aspect, a stereographic image compressor (100) comprises a function processing unit (118) which is responsive to a first image signal (110) and a second image signal (112). The first image signal (110) contains image information of a scene (104) from a first field of view (111) and the second image signal (112) contains image information of the scene from a second field of view (114). The function processing unit (118) generates a difference image signal (120) that is indicative of differences between the first image signal (110) and the second image signal (112). A lossy compressor (126) compresses information contained in the difference image signal (120) to generate a compressed image information signal (126).

In certain preferred embodiments, the compressed image information signal (126) is stored along with the first image signal (110), which is also preferably compressed. The scene (104) represented by the first (110) and second (112) image signals, together with depth information associated with the combination of the two signals, can then be recreated for display from the stored first image signal and the compressed image information signal. Storing the compressed image information signal and the compressed first image signal advantageously reduces, by a significant amount, the data storage requirements for storage of stereographic information.

These and other features and advantages of the present invention may be better understood by reference to the attached specification and drawings.

DETAILED DESCRIPTION OF THE PREFERRED EMBODIMENTS

Figure 1:
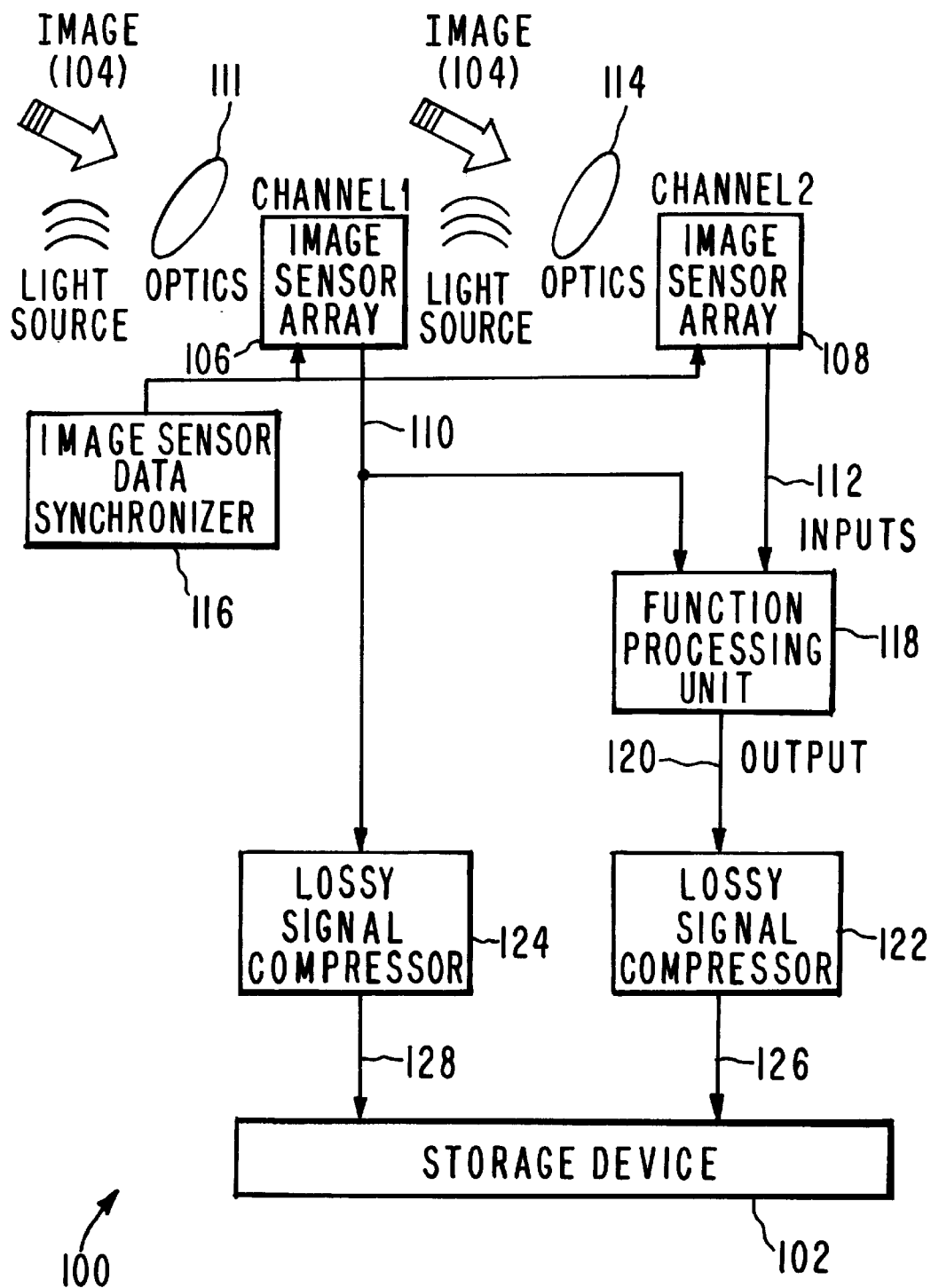
FIG. 1 is a block diagram of a stereographic image compression system employing the principles of the present invention.

In FIG. 1, a stereographic image compression system 100 operates to generate compressed image data, 126 and 128, indicative of stereographic images for storage in storage device 102. The image information stored in storage device 102 preferably comprises two channels of information. The two channels of information are generated by image sensor arrays 106 and 108. Image sensor array 106 generates an image signal 110 indicative of a first field of view 111 of image 104. Image sensor array 108 generates an image signal 112 indicative of a second field of view 114 of image 104. Image sensor arrays 106 and 108 are positioned at a predetermined distance from one another and at predetermined angles relative to one another to generate fields of view 111 and 114. Preferably image sensor arrays 106 and 108 are each conventional and employ charge coupled device technology or other conventional image sensing mechanisms that provide an electronic signal indicative of image 104. It is preferable that sensor arrays 106 and 108 are closely matched to minimize differences in signals 110 and 112 introduced by device variations in sensors 106 and 108. Image signals 110 and 112 are time varying signals which are preferably synchronized by way of image data synchronizer 116 to cause signals 110 and 112 to provide time synchronized images of fields of view 111 and 114 and allow the data contained in such signals to be operated on an individual array picture element (pixel) basis. Image data synchronizer 116 operates generally to cause signals 110 and 112 to be time synchronized. This may be accomplished in a number of ways including controlling arrays 106 and 108 to generate signals 110 and 112 synchronously. Alternatively, the image data synchronizer may receive signals 110 and 112, and compare time stamps which may be contained in such signals and control the transmission of signals 110 and 112 to the other destinations such as blocks 118 and 124.

Image signals 110 and 112 are received by function processing unit 118 which generates a difference signal 120 indicative of differences between signals 110 and 112. Difference signal 120 is compressed by a lossy signal compressor 122 to generate signal 126 which is stored on storage device 102. A second lossy signal compressor 124 compresses image signal 110 also for storage and storage device 102. Lossy signal compressors 122 and 124 are preferably conventional and may employ one of a variety of known compression techniques including JPEG, motion JPEG, or MPEG compression algorithms. The compressed difference signal 126 generated by lossy signal compressor 122 and the compressed signal 128 generated by lossy signal compressor 124 advantageously comprise all of the information required to generate a stereographic type image of image 104.

The system shown in FIG. 1 is shown for purposes of explanation only and should not be construed to be limiting in any way. For example, the system of FIG. 1 may be modified so that the signal 112 is compressed by lossy signal compressor 124 instead of signal 110. Modules 116, 118, 122 and 124 can be implemented in hardware, software and/or firmware.

Figure 2:
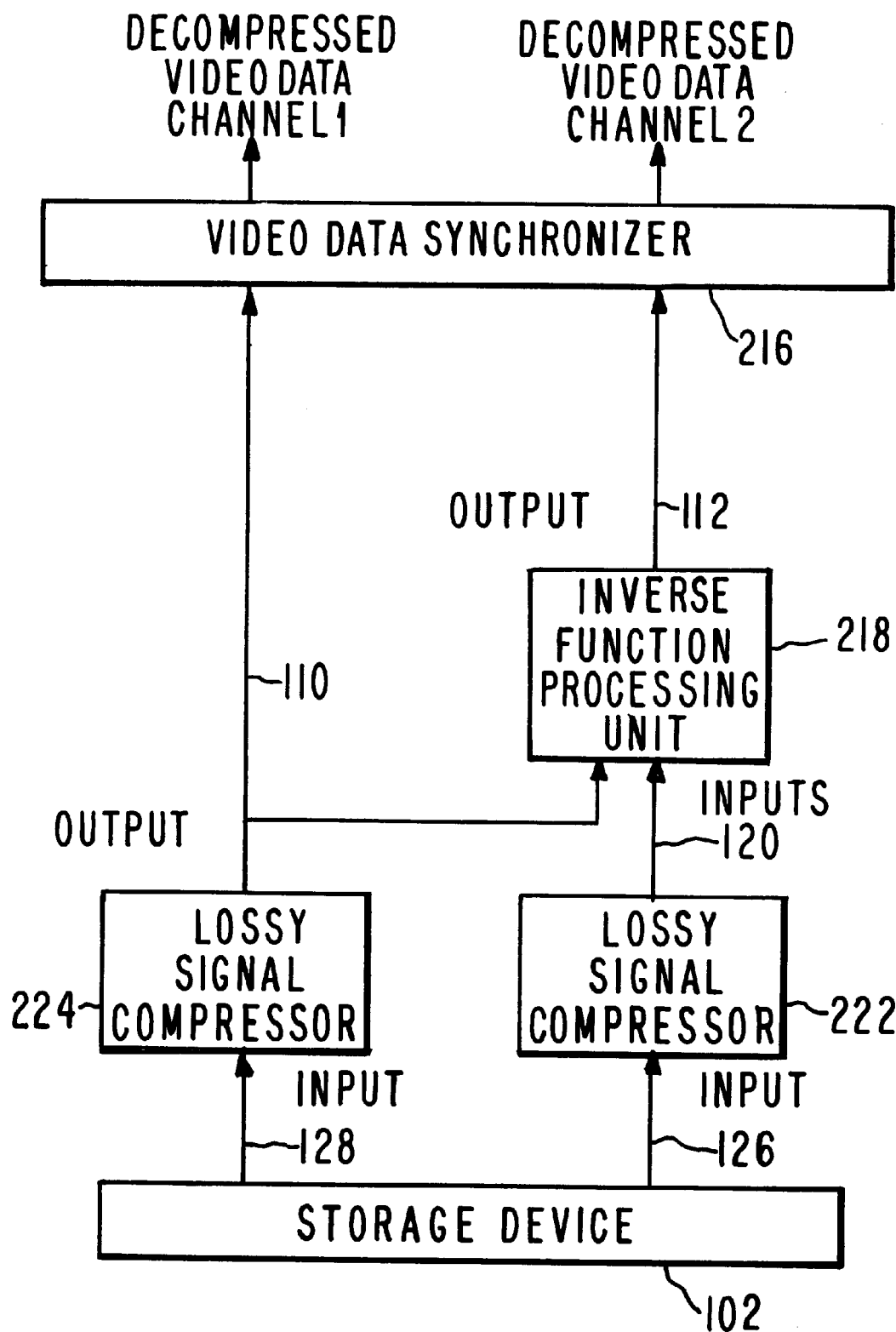
FIG. 2 is a block diagram illustrating generation of a stereographic image from data generated by the system of FIG. 1.

The image stored on storage device 102 may be recreated in a manner shown in FIG. 2. The functions shown in blocks 222, 224, 218 and 216 essentially perform the inverse function of the corresponding functions shown in FIG. 1 to generate two (2) channels 110 and 112 of data. Lossy signal compressors 224 and 222 receive data signals 128 and 126 respectively and decompress the received signals to generate signals 110 and 120. Inverse function processing unit 218 receives signals 110 and 120 and generates data signal 112. Video data synchronizer 216 receives signals 110 and 112, synchronizes the two signals to generate two channels of data (channel 1 and channel 2) which can be used in a conventional manner to generate a stereographic image.

Figure 3A:
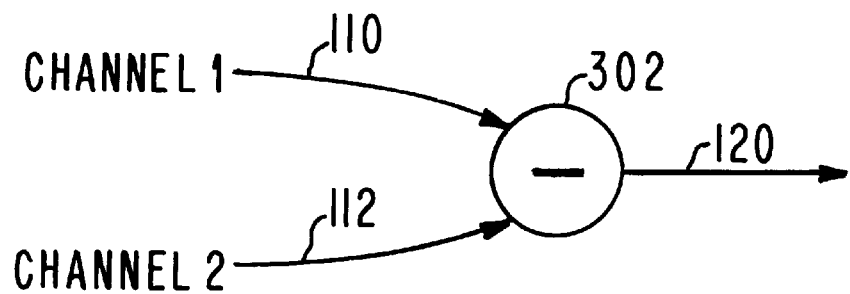
FIGS. 3(a–d) are block diagrams showing alternative embodiments of the function processing unit of FIG. 1.
Figure 3B:
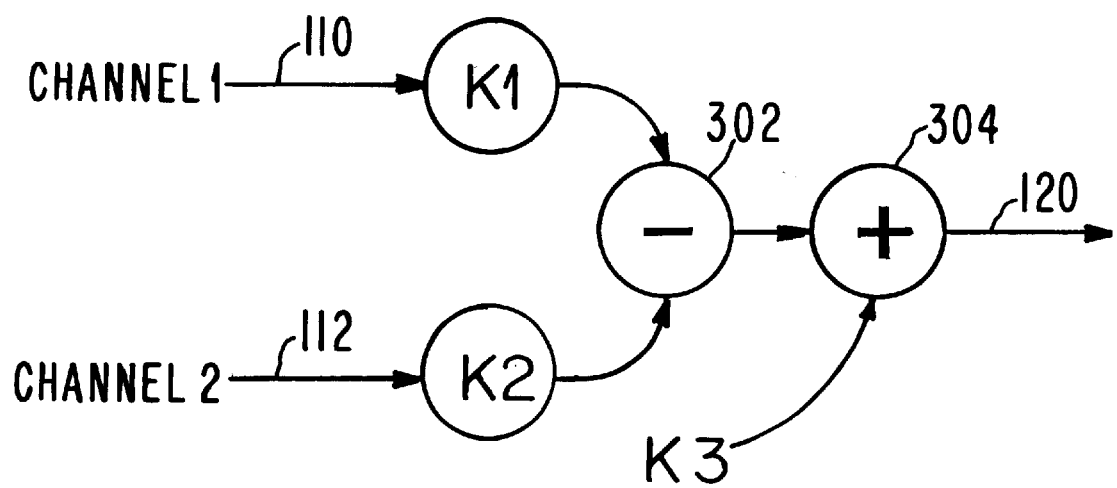
Figure 3C:
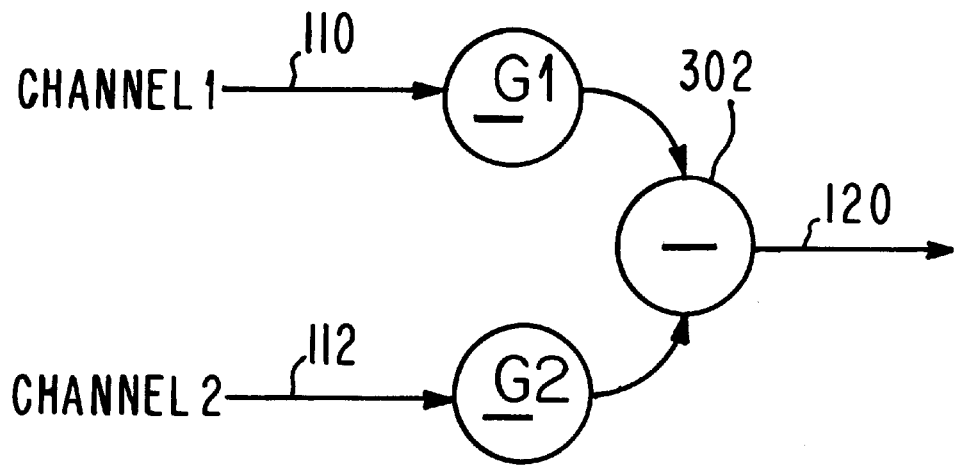
Figure 3D:
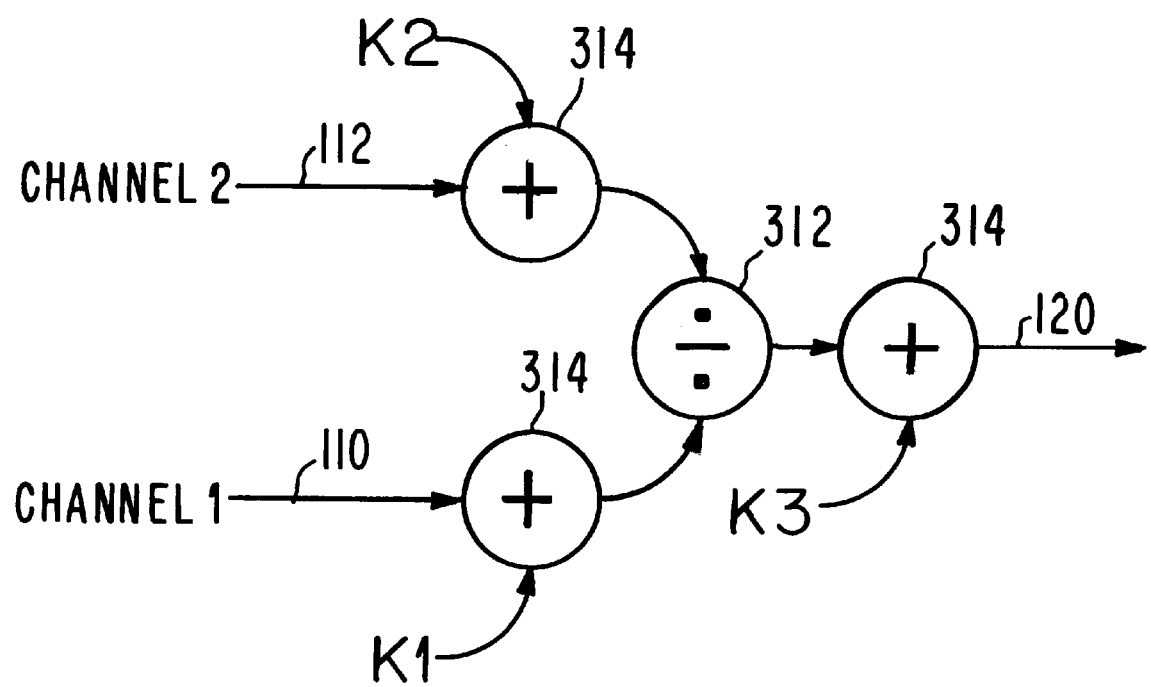

Function processing unit 118 is now described in further detail. Function processing unit 118 preferably takes one of a variety of forms to realize one of a plurality of desired mathematical functions to generate difference signal 120. Four exemplary embodiments of the mathematical functions realized by function processing unit 118 are shown in FIGS. 3(a), 3(b), 3(c) and 3(d). In FIG. 3(a), function processing unit 118 generates signal 120 by way of a subtraction function 302 that generates a difference between corresponding components of signals 110 and 112. In FIG. 3(b) function processing unit 118 scales signals 110 and 112 by respective constants K1 and K2. The difference between corresponding components of the scaled signals is then generated by subtraction function 302. This difference is further modified by addition of an offset represented by constant K3 to generate signal 120. In FIG. 3(c) function processing unit 118 signals 110 and 112 are gamma corrected by exponential values G1 and G2. Gamma correction may be used to correct for a variety of physical phenomena such as matching dynamic range of sensors 106 and 108. For example, if the sensors 106 and 108 provide data, such as twelve-bits per pixel, which exceeds the capacity of the storage device 102 (which may ideally have a capability of eight-bits per pixel) then gamma correction may be used to narrow the dynamic range of the signals 110 and 112 to match the storage capacity of the storage device 102. As a further example, gamma correction may be used to correct for sensor non-linearity. The resulting signals are then fed to subtraction function 302, which generates difference signal 120. In FIG. 3(d) signals 110 and 112 are first scaled by addition of constants K1 and K2 respectively. The resulting signals are then divided by module 312. The resulting value is then modified by way of addition of constant K3 to generate signal 120.

The embodiments shown in FIGS. 3(a), 3(b), 3(c) and 3(d) may operate on either digital or analog representations of signals 110 and 112. The constants such as K1, K2 K3, G1 and G2 that are used for scaling, offsetting or gamma-correcting are preferably either predetermined or selectable to generate difference signal 120 in a manner that provides an acceptable image quality but meets the storage requirements of a particular application. Preferably, the mathematical function shown in FIGS. 3(a), 3(b), 3(c) and 3(d) or other acceptable mathematical function, may be selectable by a user. The user can thus judge which function is appropriate based on prior experience. Alternatively, the functions shown in FIGS. 3(a) to 3(d) may be chosen based on a display providing indication of the amount of output data bandwidth required to represent the difference signal 126.

Figure 4:
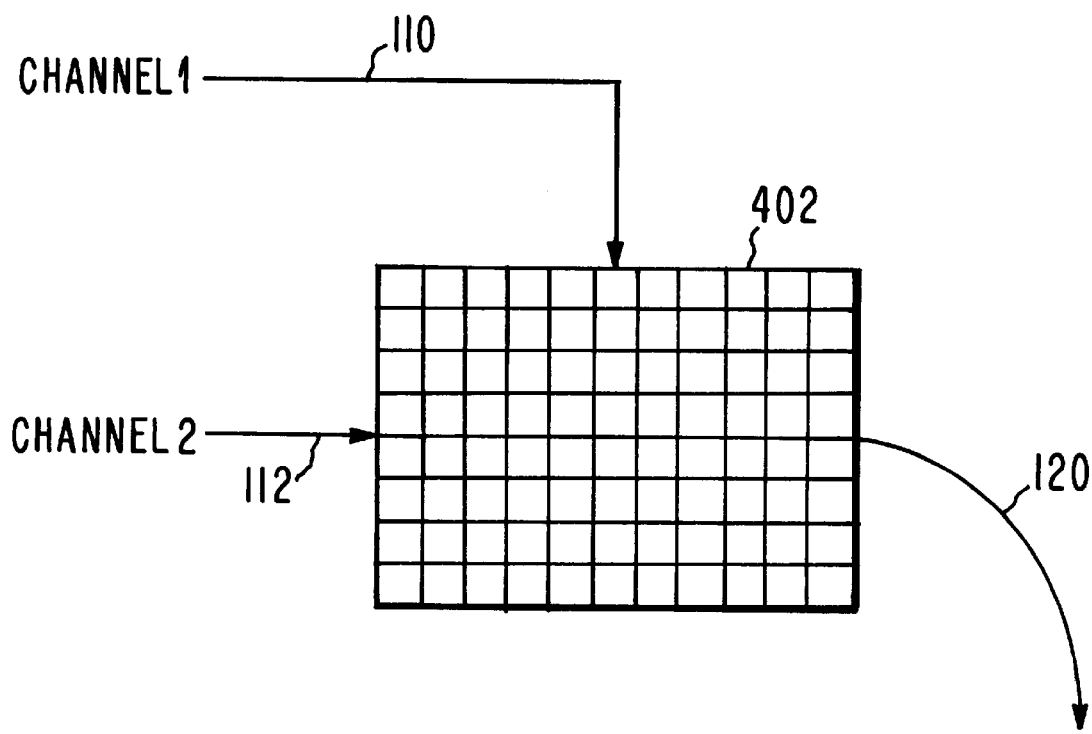
FIG. 4 is a block diagram showing further details of a specific embodiment of the function processing unit of FIG. 1.

FIG. 4 shows an embodiment of function processing unit 118 which operates on digital representations of signals 110 and 112. In FIG. 4, a look-up table 402 is used to store values indicative of predetermined relationships between signals 110 and 112. The lookup table 402 may advantageously be implemented by conventional random-access type of memories. Signals 110 and 112 are used as addresses to access table 412 to generate stored data values 120. The embodiment shown in FIG. 4 advantageously provides rapid generation of signal 120 in response to signals 110 and 112. In the embodiment shown in FIG. 4, the data synchronizer 116, and lossy signal compressors 122 and 124 may also be implemented by digital mechanisms, including programmed digital computers. In alternative embodiments, function processing unit 118 may be realized by analog circuit components to perform the addition, subtraction, multiplication and division functions shown in FIGS. 3(a), 3(b), 3(c) and 3(d). For such analog embodiments data synchronizer 116 and signal compressors 122 and 124 may be implemented with either analog or digital mechanisms (including hardware and software) to meet the cost, performance, packaging and other requirements of a particular application.

The goal of the output data 120 of the function processing unit 118 is to represent an approximation to the incoherence between the element data of the two sensor arrays 106 and 108. This transensor incoherence advantageously compresses highly with traditional lossy compression techniques such as employed by compressors 124 and 122. This high compression factor is due to the large amount of spatial coherence present in many regions of the transensor incoherence data. For the extreme case of the image sensors 106 and 108 imaging only far away image objects, the two sensors may have an identical synchronized output data. For this case, utilizing a simple difference processing function such as implemented in FIG. 3(a) results in all zero data from the output of function processing unit 118. This all zero data compresses highly with many lossy compression algorithms. Using this method on many photographic scenes using a spacing between sensors 106 and 108 of an amount approximately the inter-ocular spacing of the human eye, the amount of compression achieved may be much higher than for the case where lossy compression is directly applied to the output of the two sensors. For the case of directly applied compression the image data for two channels is approximately two times the data required for one image channel. While using the function processing techniques described herein, the two channels may require only between 10% and 20% more data size than one channel alone.

The principles described herein may be used with a single frame of image data for still image photography, as well as with time sequential frames for video images as described above. For stationary image scenes a single sensor (106 or 108) may be used to generate depth information by recording the image 104 at two different points in time to capture fields of view 111 and 114. In this case, the image sensor output is stored from two different locations. The function processing unit 118 and lossy compressors 122 and 124 simply operate on the stored data rather than the data directly from the image sensors.

It is to be understood that the specific mechanisms and techniques which have been described are merely illustrative of one application of the principles of the invention. Numerous modifications may be made to the methods and apparatus described without departing from the true spirit of the invention.

What is claimed is:

1. A stereographic image compressor comprising:
   a function processing unit, responsive to a first image signal containing image information of a scene from a first field of view, and a second image signal containing image information of said scene from a second field of view, for generating a difference image signal, indicative of differences between said first image signal and said second image signal; and
   a lossy compressor, responsive to said difference image signal, for compressing image information contained in said signal, to generate a compressed image information signal; wherein
   said function processing unit comprises means for generating said difference image signal by scaling said first image signal with a first constant to generate a scaled first image signal, scaling said second image signal with a second constant to generate a scaled second image signal, and subtracting image information contained in said scaled first image signal from image information contained in said scaled second image signal.

2. A stereographic image compressor comprising:
   a function processing unit, responsive to a first image signal containing image information of a scene from a first field of view, and a second image signal containing image information of said scene from a second field of view, for generating a difference image signal, indicative of differences between said first image signal and said second image signal; and
   a lossy compressor, responsive to said difference image signal, for compressing image information contained in said signal, to generate a compressed image information signal; wherein
   said function processing unit comprises means for generating said difference image signal by correcting said first image signal with a first exponential constant to generate a corrected first image signal, correcting said second image signal with a second exponential constant to generate a corrected second image signal, and subtracting image information contained in said corrected first image signal from image information contained in said corrected second image signal.

3. A stereographic image compressor as set forth in claim 2 further comprising a storage device, responsive to said lossy compressor, for storing data indicative of said compressed image information signal.

4. A stereographic image compressor comprising:
   a function processing unit, responsive to a first image signal containing image information of a scene from a first field of view, and a second image signal containing image information of said scene from a second field of view, for generating a difference image signal, indicative of differences between said first image signal and said second image signal; and
   a lossy compressor, responsive to said difference image signal, for compressing image information contained in said signal, to generate a compressed image information signal; wherein
   said function processing unit comprises means for generating said difference image signal by correcting said first image signal with a first offset constant to generate a corrected first image signal, correcting said second image signal with a second offset constant to generate a corrected second image signal, dividing image information contained in said corrected second image signal by image information contained in said corrected first image signal to generate an intermediate difference signal, and scaling said intermediate difference signal with a scaling value to generate said difference signal.

5. A stereographic image compressor as set forth in claim 4 further comprising a synchronizer for causing said first image signal and said second image signal to be time synchronized.

6. A stereographic image compressor comprising:
   a function processing unit, responsive to a first image signal containing image information of a scene from a first field of view, and a second image signal containing image information of said scene from a second field of view, for generating a difference image signal, indicative of differences between said first image signal and said second image signal; and
   a lossy compressor, responsive to said difference image signal, for compressing image information contained in said signal, to generate a compressed image information signal; wherein
   said function processing unit comprises a look-up table, responsive to said first image signal and said second image signal for providing a value, from a plurality of stored values, indicative of said difference image signal.

7. Apparatus for compressing image data taken of a similar field of view from two different locations, said apparatus comprising:
   synchronizing means, responsive to a pair of image signals, comprising a first image signal containing image information corresponding to a first of said two locations and a second image signal containing image information corresponding to said second of said two locations, for time synchronizing said first image signal with said second image signal;
   difference generation means, responsive to said synchronizing means, for generating a difference signal, indicative of differences between said first and said second image signals; and
   lossy compressor means, responsive to said difference generation means, for compressing said difference signal; wherein
   said difference generation means further comprises:
      means for weighting said first and said second image signals with a corresponding weight to generate a weighted first image signal and a weighted second image signal; and
      means for subtracting image information contained in said weighted first image signal and said weighted second image signal to generate said difference signal.

8. Apparatus as set forth in claim 7 further comprising a storage device for storing said difference signal.

9. Apparatus as set forth in claim 8 wherein said storage device further stores said first image signal.

10. Apparatus for compressing image data taken of a similar field of view from two different locations, said apparatus comprising:
    synchronizing means, responsive to a pair of image signals, comprising a first image signal containing image information corresponding to a first of said two locations and a second image signal containing image information corresponding to said second of said two locations, for time synchronizing said first image signal with said second image signal;

difference generation means, responsive to said synchronizing means, for generating a difference signal, indicative of differences between said first and said second image signals; and lossy compressor means, responsive to said difference generation means, for compressing said difference signal; wherein said difference generation means further comprises:
means for weighting said first and said second image signals with a corresponding weight to generate a weighted first image signal and a weighted second image signal;
means for subtracting image information contained in said weighted first image signal and said weighted second image signal to generate an intermediate difference signal; and
means for offsetting said intermediate difference signal with an offset value to generate said difference signal.

11. Apparatus for compressing image data taken of a similar field of view from two different locations, said apparatus comprising:

synchronizing means, responsive to a pair of image signals, comprising a first image signal containing image information corresponding to a first of said two locations and a second image signal containing image information corresponding to said second of said two locations, for time synchronizing said first image signal with said second image signal;

difference generation means, responsive to said synchronizing means, for generating a difference signal, indicative of differences between said first and said second image signals; and lossy compressor means, responsive to said difference generation means, for compressing said difference signal; wherein said difference generation means further comprises:
means for modifying said first and said second image signals with a corresponding first and second gamma correction factor to generate a gamma corrected first image signal and a gamma corrected second image signal; and
means for subtracting image information contained in said gamma corrected first image signal from image information contained in said gamma corrected second image signal to generate said difference signal.

12. Apparatus for compressing image data taken of a similar field of view from two different locations, said apparatus comprising:

synchronizing means, responsive to a pair of image signals, comprising a first image signal containing image information corresponding to a first of said two locations and a second image signal containing image information corresponding to said second of said two locations, for time synchronizing said first image signal with said second image signal;

difference generation means, responsive to said synchronizing means, for generating a difference signal, indicative of differences between said first and said second image signals; and lossy compressor means, responsive to said difference generation means, for compressing said difference signal; wherein said difference generation means further comprises:
means for weighting said first and said second image signals with a corresponding weight to generate a weighted first image signal and a weighted second image signal, and
means for dividing image information contained in said weighted first image signal and said weighted second image signal to generate said difference signal.

13. Apparatus for compressing image data taken of a similar field of view from two different locations, said apparatus comprising:

synchronizing means, responsive to a pair of image signals, comprising a first image signal containing image information corresponding to a first of said two locations and a second image signal containing image information corresponding to said second of said two locations, for time synchronizing said first image signal with said second image signal;

difference generation means, responsive to said synchronizing means, for generating a difference signal, indicative of differences between said first and said second image signals; and lossy compressor means, responsive to said difference generation means, for compressing said difference signal; wherein said difference generation means further comprises:
means for weighting said first and said second image signals with a corresponding weight to generate a weighted first image signal and a weighted second image signal;
means for dividing image information contained in said weighted first image signal and said weighted second image signal to generate an intermediate difference signal; and
means for offsetting said intermediate difference signal with an offset value to generate said difference signal.

14. A method for compressing stereographic image data, said method comprising:

receiving a first image signal indicative of a first field of view of an image;

receiving a second image signal indicative of a second field of view of an image;

generating a difference signal indicative of differences in images indicated by said first image signal and said second image signal; and performing lossy compression on said difference signal to generate a compressed difference signal and performing lossy compression on said first image signal to generate a first compressed image signal;

wherein said difference signal is generated by scaling said first image signal with a first constant to generate a scaled first image signal, scaling said second image signal with a second constant to generate a scaled second image signal, and subtracting image information contained in said scaled first image signal from image information contained in said scaled second image signal.

15. A computer readable storage medium comprising a stereographic image compressor, comprising:

a function processing unit, responsive to a first image signal containing image information of a scene from a first field of view, and a second image signal containing image information of said scene from a second field of view, for generating a difference image signal, indicative of differences between said first image signal and said second image signal; and a lossy compressor, responsive to said difference image signal, for compressing image information contained in said signal, to generate a compressed image information signal; wherein said difference image signal is generated by scaling said first image signal with a first constant to generate a scaled first image signal, scaling said second image signal with a second constant to generate a scaled second image signal, and subtracting image information contained in said scaled first image signal from image information contained in said scaled second image signal.

* * * * *